(12) United States Patent
Seitz

(10) Patent No.: US 10,838,778 B2
(45) Date of Patent: Nov. 17, 2020

(54) HYBRID APPLICATION SYSTEM TO UTILIZE NATIVE DEVICE FEATURES OF A MOBILE DEVICE

(71) Applicant: Mobile Tappestry, LLC, Oklahoma City, OK (US)

(72) Inventor: Scott Michael Seitz, Oklahoma City, OK (US)

(73) Assignee: MOBILE TAPPESTRY, LLC, Oklahoma City, OK (US)

( * ) Notice: Subject to any disclaimer, the term of this patent is extended or adjusted under 35 U.S.C. 154(b) by 223 days.

(21) Appl. No.: 15/424,099

(22) Filed: Feb. 3, 2017

(65) Prior Publication Data

US 2017/0228263 A1 Aug. 10, 2017

Related U.S. Application Data

(60) Provisional application No. 62/291,075, filed on Feb. 4, 2016.

(51) Int. Cl.
  *G06F 9/54* (2006.01)
  *G06F 8/71* (2018.01)
  *G06F 9/50* (2006.01)

(52) U.S. Cl.
  CPC .............. *G06F 9/541* (2013.01); *G06F 8/71* (2013.01); *G06F 9/5027* (2013.01); *G06F 2209/509* (2013.01)

(58) Field of Classification Search
  CPC .......... G06F 9/541; G06F 9/5027; G06F 8/71; G06F 2209/509
  See application file for complete search history.

(56) References Cited

U.S. PATENT DOCUMENTS

| 2002/0016915 | A1* | 2/2002 | Kumazawa | G06F 21/64 713/176 |
| 2008/0189360 | A1* | 8/2008 | Kiley | G06F 17/30867 709/203 |
| 2013/0151996 | A1 | 6/2013 | Nario et al. | |
| 2014/0109115 | A1 | 4/2014 | Low et al. | |
| 2014/0337414 | A1 | 11/2014 | Sojoodi et al. | |

(Continued)

FOREIGN PATENT DOCUMENTS

WO   WO 2015/171128   11/2015

OTHER PUBLICATIONS

International Search Report and Written Opinion regarding PCT Serial No. PCT/US17/16533 dated Jun. 19, 2017, 9 pages.

*Primary Examiner* — Doon Y Chow
*Assistant Examiner* — Phuong N Hoang
(74) *Attorney, Agent, or Firm* — Dunlap Codding, P.C.

(57) ABSTRACT

A system and method for accessing native device hardware features, such as a camera or a microphone, using a mobile application is described. The mobile application has an internal browser and at least one program file having instructions used by the internal browser to access the at least one native device hardware features. The mobile application has software configured to enable access to the at least one native device hardware feature for at least one external website configured to work with the mobile application, hosted on an external web server, and rendered in the internal browser, by receiving information from the external website to trigger serving at least one program file to the internal browser from the mobile application as a localhost.

13 Claims, 4 Drawing Sheets

(56) References Cited

U.S. PATENT DOCUMENTS

| | | | |
|---|---|---|---|
| 2014/0344670 A1* | 11/2014 | Cathey | G06F 17/30867 715/234 |
| 2015/0120357 A1* | 4/2015 | Tuchman | G06Q 10/063114 705/7.15 |
| 2015/0212990 A1* | 7/2015 | Tseng | G06F 40/103 715/234 |
| 2017/0053299 A1* | 2/2017 | Rozga | G06Q 30/0203 |

* cited by examiner

HYBRID APPLICATION SYSTEM TO UTILIZE NATIVE DEVICE FEATURES OF A MOBILE DEVICE

The present patent application claims priority to the provisional patent application identified by U.S. Ser. No. 62/291,075, filed on Feb. 4, 2016, the entire content of which is hereby incorporated herein by reference.

BACKGROUND OF THE INVENTION

Websites are built to run in web browsers, while native applications, known as native apps, are application programs developed on a particular platform or device (e.g. iPhone). There exists a huge number of web development companies to service the roughly one billion existing websites. Compare this to a much smaller number of app development companies and under two million existing native applications in each of the two largest application stores (i.e., Apple App Store and Google Play Store). Each native application development environment (e.g. iOS, Android, Windows) takes an entirely different set of skills than web development, as well as from each other.

Native application development allows for a more robust digital presence due to its access to native device hardware features of the mobile device. Native device hardware features can include, but are not limited to, the camera, microphone, GPS sensors, accelerometer, compass, filesystem, calendar, contacts, vibration, push notifications, etc. Websites rendering in browsers run by mobile devices, such as cell phones and tablet computers, generally do not have access to the wide variety of these native device hardware features.

HTML5 has attempted to bring directly to the web browser access to native device hardware features (thus to web developers), but as this may require the cooperation of all hardware and native OS vendors as well as browser vendors to fully implement, efforts to keep up with emerging features experience delay and typically lag significantly.

Compiling engines such as Cordova were created to allow developers with web-based skills (e.g., HTML, JavaScript, CSS) an entry point to the more robust and lucrative application development market for mobile devices without having to learn the native application development languages and platforms (e.g. Objective-C and Xcode for iOS, Java and Android Studio for Android). This combination of using web-based languages and skills to package webcode into a compiled native application is referred to as "hybrid app development". Hybrid applications created with the Cordova platform, for example, provide the ability to access the native device features of a mobile device using javascript files that run in the hybrid application's internal browser or "webview" along with and available to the web-code packaged into the app.

Some web developers have learned to produce native applications via any number of hybrid application development techniques and platforms, but there is still a sizable learning curve that causes significant approach avoidance for most web development companies due to the necessary investment in time and resources.

The development of a native application using typical hybrid application development technologies is still a separate project and code base from a customer's website. Therefore, for a customer to make a change to their overall "digital presence", they have to account for and coordinate changes to two or more projects, often with two or more vendors. Further, since the webcode is packaged into the app, in order to make a change the hybrid application has to be recompiled, resubmitted for approval, and redistributed for any changes to reach the end user consumer of the app, whereas a change made to customer's website reaches the end consumer immediately via a browser.

A few attempts have been made to be able to allow an external website to be rendered as the content of a native application by redirecting the app's internal browser to pull its content from an external website server, but prior art attempts at such technology have flaws. If an external website can be rendered as the content of a native application without such flaws and particularly with access to the native device features of the mobile devices, web development companies could quickly enter the application development market and service their large existing customer bases by adding more robust applications to their customers' digital presences within the same or different development project as their customers' existing websites.

BRIEF DESCRIPTION OF SEVERAL VIEWS OF THE DRAWINGS

To assist those of ordinary skill in the relevant art in making and using the subject matter hereof, reference is made to the appended drawings, in which like reference numerals are intended to refer to similar elements for consistency. For purposes of clarity, not every component may be labeled in every drawing.

DETAILED DESCRIPTION

Figure 1:
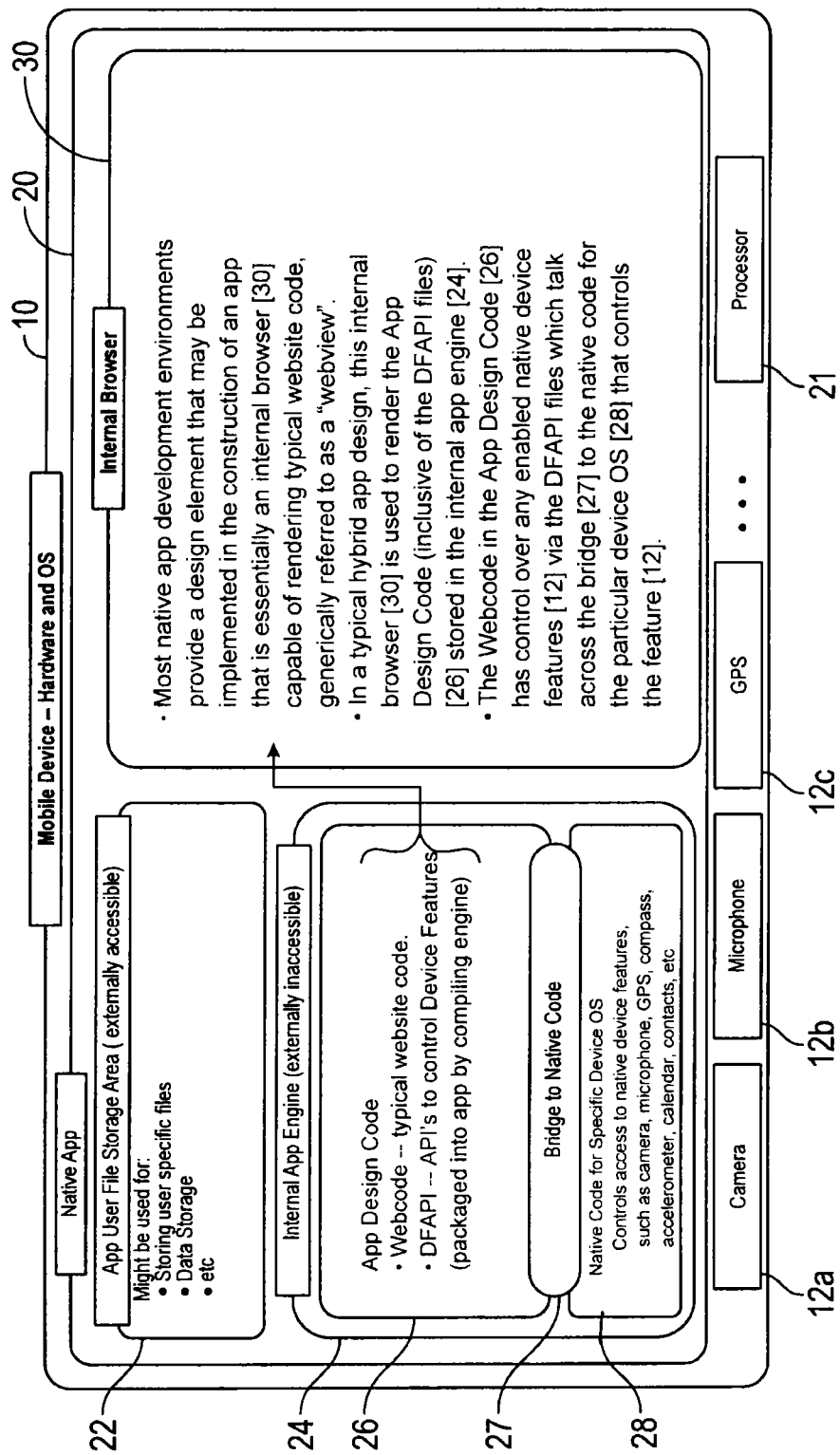
FIG. 1 illustrates a schematic diagram of a prior art hybrid application design for applying web development skills (e.g., HTML, JavaScript, CSS) to the development of native applications for multiple mobile device operating system platforms (e.g., iOS, Android, Microsoft) through the use of a compiling engine (e.g., Cordova) that packages the web code into native apps, to be rendered in the internal browser of the app.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, the term "e.g." is an abbreviation meaning "for example."

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software or website code may include one or more computer readable instructions that when executed by one or more components cause the component to perform a specified function. It should be understood that the software or website code described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

It is to be further understood that, as used herein, the term user may be a human being using a mobile device.

The term "DFAPI" as used herein, is an acronym that stands for Device Feature Application Program Interface. An Application Program Interface (API) is a set of routines, protocols or tools for building software applications. The term (DFAPI) was created for the purposes of this disclosure and is intended to represent the instructions (or API's) used by website code to access and control native device features. The DFAPI files may be written in Javascript or another suitable programming language.

The term "domain" is a realm of administrative autonomy, authority, or control within the internet defined by an identifying string such as a domain name or IP Address. It is used herein to represent any particular website served to a browser by a web server, as opposed to any other website under different authority (www.joeswebsite.com vs www.samswebsite.com). Browsers store information about domains that they have visited, such as localStorage variables, cookies, and cached files in order to improve the user experience when a domain (website) is revisited. For instance, a browser may store your user credentials in localStorage variables so that you don't need to remember and retype them each time you desire to log in, or a browser may know that you are already logged in by use of cookies. A browser also caches files it receives from a domain's server so that they don't have to be pulled across the internet every time you visit another page in the same domain. For privacy and security reasons, browsers will not share any of this information from one domain with any other domain, lest www.hacker.com might glean your user credentials from the localStorage variables for www.mybank.com.

The term "internal domain" is defined herein as the domain represented by the web code packaged into a native application by a compiling engine or hybrid application development framework when rendering in the internal browser of the native application.

The term "Handshake" as used herein, refers to a sequence of steps that prepares a mobile device to execute website code supplied from an external web server utilizing at least one DFAPI stored locally on the mobile device. In one embodiment, the handshake includes programmatically creating an iFrame loaded with a page from the target domain supplied by the TargetDomainHandshakeCode, and using postMessage to set appropriate localStorage variables in the target domain and to confirm to the source domain that the target domain has the appropriate AppSupportCode available.

The term "iFrame", as used herein, is an HTML document embedded inside another HTML document on a webpage, each generally representing different domains. iFrames allow more than one domain to be represented in a browser at one time, such as an advertisement provided by adtraffic.com showing on a webpage from www.joeswebsite.com. It is important to note that cross-domain browser security rules still apply.

Figure 2:
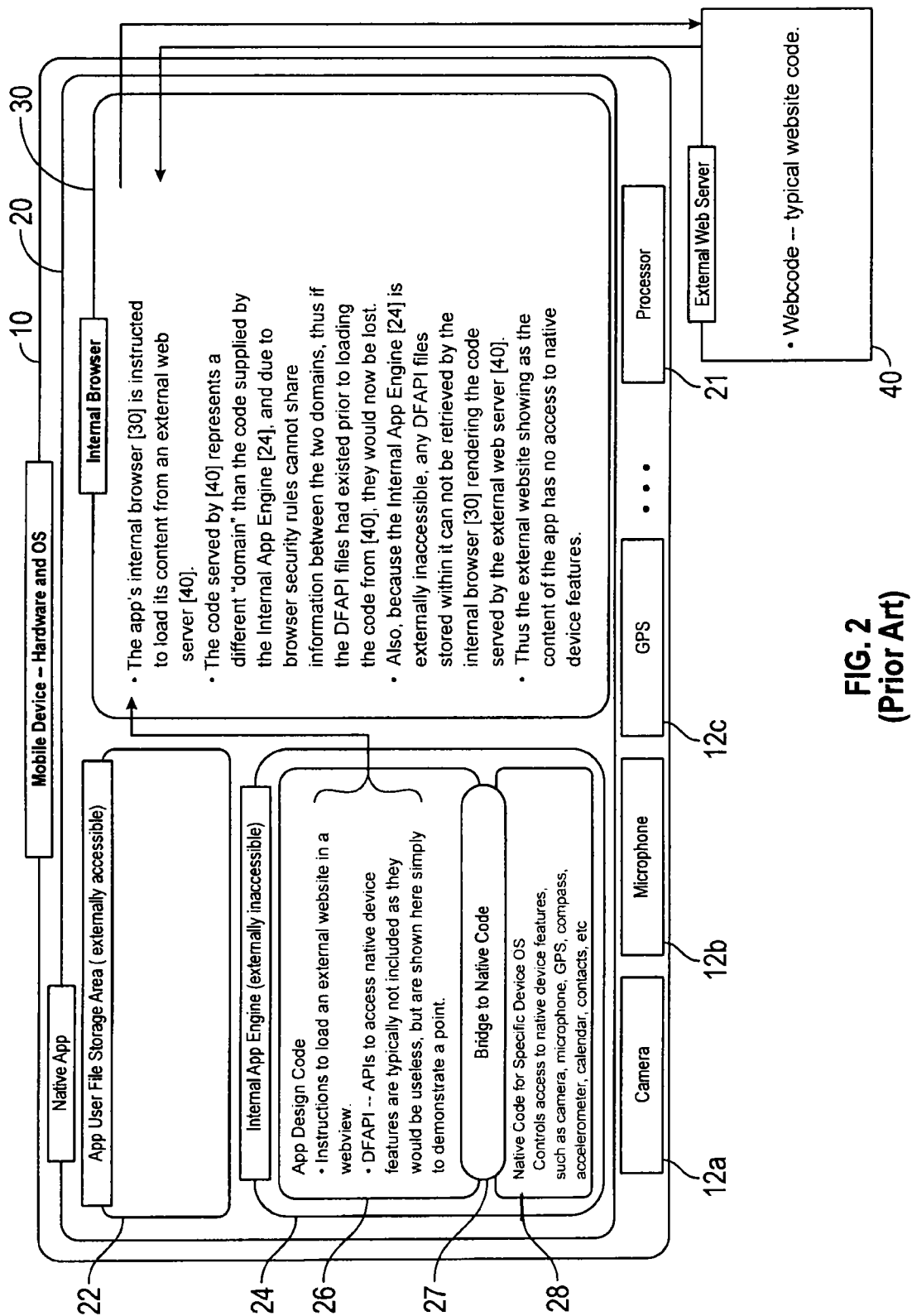
FIG. 2 illustrates a schematic diagram of a prior art application wrapper design achieved by rendering an external website in the internal browser of a native application, which does not include access to the native device hardware features.
Figure 3:
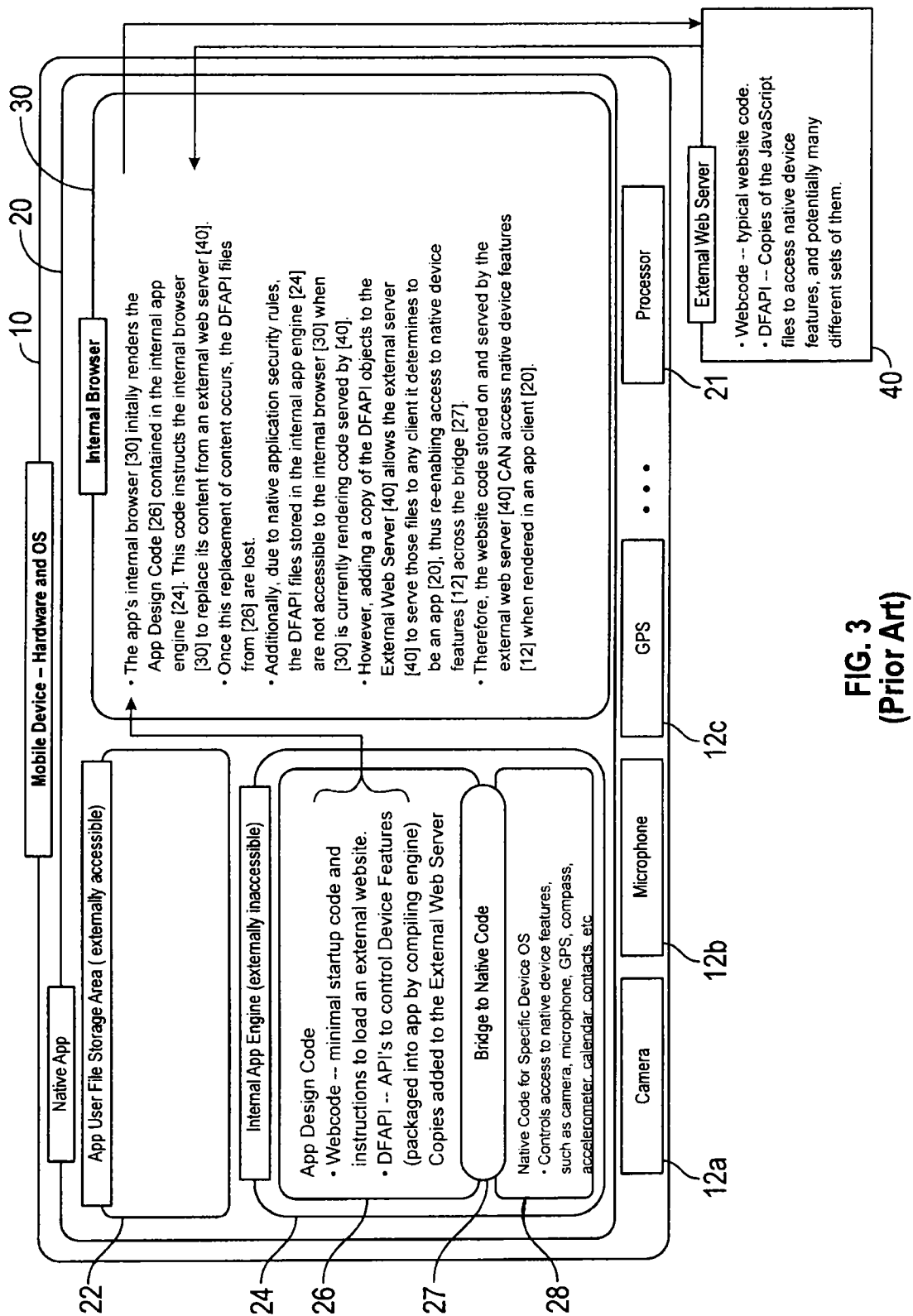
FIG. 3 illustrates a schematic diagram of a prior art application design that renders an external website in the internal browser of a native application with access to native device hardware features.

Referring now to the Figures, and in particular to FIGS. 1-3, shown therein are prior art designs for hybrid application development in a mobile device 10 having native device hardware features 12.

As illustrated in FIG. 1, generally, a mobile development framework (e.g. Cordova) is used to provide a mobile device 10 having native device hardware features 12 with website code representing the design of a desired native application 20 having access to native device hardware features 12. This website code can consist of any number of web languages including, but not limited to, HTML, HTML5, CSS, JavaScript and/or the like, and is ultimately packaged into and contained within the native application 20 by the mobile development framework's compiling engine. Access to the native device hardware features 12 is typically added via "plug-ins" written for the specific mobile development framework being used. A plug-in typically represents a common JavaScript API (Application Programming Interface) through which the website code interfaces with a particular native device hardware feature 12 (e.g. Camera), as well as the native device code necessary to access the same feature 12 for each of the mobile device platforms represented (e.g. iOS, Android, Microsoft).

Once the appropriate plug-ins and website code have been added to the mobile development framework project, the compiling engine is run to produce a hybrid application 20. The compiler packages the necessary code into an Internal App Engine 24. The schematics represent an easy way to visualize the components of code relevant to the understanding of the present disclosure. The common JavaScript APIs, here referred to as DFAPI as defined above, and referred to in a previously filed provisional application No. 62/291,075 as HWJS files (HWJS stands for "HardWare JavaScript"), are included with the website code 26 and are central to the understanding of the present disclosure. An internal browser 30 runs the website code 26, inclusive of the DFAPI files which give the website code access to the native device hardware features 12 by interfacing with native code 28 that controls the features across a mobile development framework's bridge 27.

When the hybrid application 20 runs on the mobile device 10, the website code 26 (inclusive of the DFAPI files), herein referred to as the "internal domain", is rendered in the native application's internal browser or "webview" 30.

The native application 20 may then be distributed to users typically by submission to various application platform stores. Because the website code 26 that determines the design of the application is packaged into the hybrid application 20, any time an update is made, the project must be recompiled and resubmitted to the application platform stores.

FIG. 2 illustrates a simple hybrid application design commonly referred to as an "App Wrapper" that is shown here to demonstrate that the internal browser 30 of a native application 20 may be instructed by code served from the internal domain to request its new content from an external web server 40. This is analogous to clicking on a link in a webpage and having your browser load a new website. The important concept to illustrate here relevant to the understanding of the current disclosure is that once the internal browser 30 pulls its new content from the domain represented by the external web server 40, the new domain running in the internal browser 30 would not have access to the DFAPI files used by the internal domain since browsers will not share information or cached files between domains. Additionally, native application security rules would not allow the external domain running in the internal browser 30 to request the DFAPI files from the internal domain. Thus, the prior art application shown in FIG. 2 is unable, when loading website code from the external web server 40, to access and/or use the native device hardware features 12 of the mobile device 10.

FIG. 3 illustrates another prior art design for hybrid application development in the mobile device 10 having native device hardware features 12. Like the prior art described in FIG. 2, code served from the internal domain instructs the internal browser 30 to request its new content from an external web server 40. In order to overcome the lack of access to the DFAPI files from the internal domain, this prior art design for hybrid application development relies on making a copy of the DFAPI files to store on the external web server 40 from which they are accessible as part of the external domain. When the external web server 40 determines that it is serving an application client as opposed to a browser client, it serves the DFAPI files as well, thus allowing the external website rendering in the internal browser 30 to access the native device hardware features.

In practicality, loading the DFAPI files on every page load of the external domain may be problematic, as every page load is expensive in terms of bandwidth, and the length of time to load each page increases. Additionally, one or more DFAPI files may be interrupted during loading, causing the prior art hybrid application 20 shown in FIG. 3 to perform non-optimally or not at all.

Also, each app client type (iOS, Android, Windows, etc.) requires a different set of DFAPI files while a browser client would fail if it loaded any DFAPI files. This prior art required the web server to run an algorithm to determine what type of client it was serving in order to supply the correct set of files. The inputs to the algorithm were information passed by the client through the use of cookies, query strings, or the like. In practicality, web hosts sometimes ignore cookies and query strings in order to improve speed and efficiency through server-side caching and thus run the risk of causing all client types to perform non-optimally or not at all.

Given that each app client type requires a different set of DFAPI files, keeping copies of the DFAPI files for each client type on the external web server 40 synced with the DFAPI files in the various internal application engines 24 may be difficult and time-consuming, as they must be updated each time a native device feature plugin is updated, added, removed, or the hybrid application 20 is recompiled, and/or the like. Further, rolling out new versions of the hybrid application 20 may cause issues as the web server algorithm will have to be updated to be aware that multiple sets of DFAPI files may exist for even the same client type (e.g. v1 and v2 for an iOS app client) in order to support users that may upgrade from one app version to the next over time.

Another problem with this prior art is the increase in the response time of the web server, as it cannot make use of server-side caching and it has to run through additional algorithms on every page load in order to avoid misidentification of client type.

Figure 4:
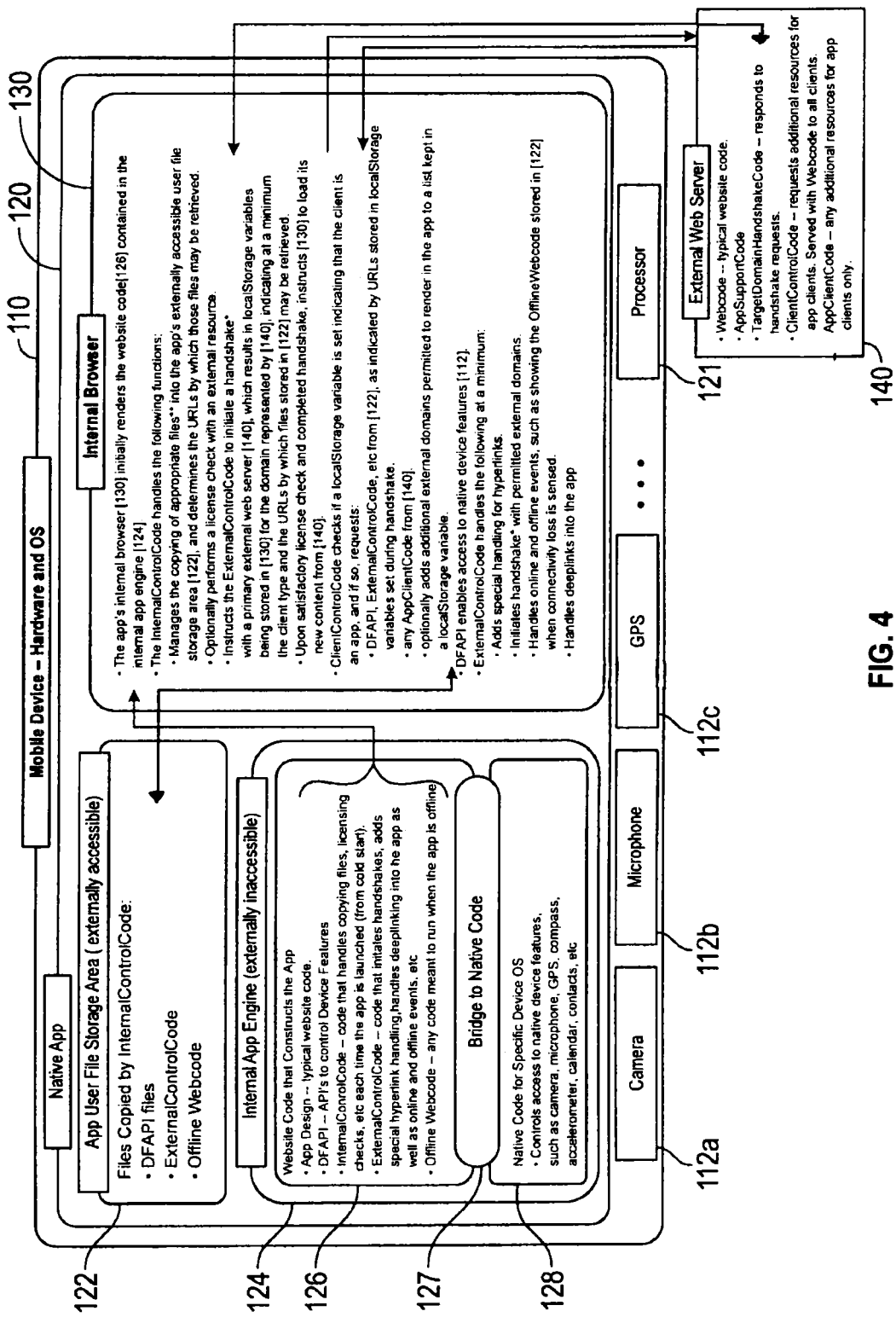
FIG. 4 illustrates a schematic diagram of an embodiment of a mobile device running an app based upon an application design configured to allow an external website to render in the internal browser of the native application with access to native device hardware features in accordance with the present disclosure.

FIG. 4 illustrates a schematic diagram of a mobile device 110 constructed in accordance with the present disclosure and having one or more native device hardware features 112a, 112b and 112c. The mobile device 110 is running a mobile application 120. In one embodiment, the mobile application 120 is constructed in accordance with a hybrid application design configured to allow an external website running in the internal browser 130 to access and use the one or more native device hardware features 112a, 112b, and 112c in accordance with the present disclosure. The mobile application 120 will be described hereinafter in the specific embodiment in which the mobile application 120 is constructed using a hybrid application design. However, it should be understood that the mobile application 120 can be constructed using a native design. As will be discussed below, the mobile application 120 causes the mobile device 110 to (1) enable DFAPI files stored in the non-transitory computer readable medium of the mobile device 110 to be accessible and usable by website code running on the mobile device 110 but supplied by an external web server 140 and (2) request, without user assistance or intervention, that the external web server 140 supply any files needed by the mobile device 110 to run the website code.

Generally, the mobile device 110 has the one or more native device hardware features 112a, 112b, and 112c, and a component, such as a processor 111 executing the mobile application 120. Native device hardware features 112a, 112b, 112c may include, but are not limited to, a camera, a microphone, one or more GPS sensors, a biometric reader (e.g., fingerprint scanner), and/or the like.

The mobile device 110 is a computing device having integrated external communication capabilities (e.g., cellular, wi-fi, or Bluetooth) and uses a mobile operating system, such as a ios, android, windows mobile, Palm OS, symbian or the like. Exemplary mobile devices include, but are not limited to, tablet computers and smartphones.

The methodology as discussed herein may be executed by the one or more processors 111. Exemplary embodiments of the one or more processors 111 may include, but are not limited to, digital signal processor (DSP), a central processing unit (CPU), a field programmable gate array (FPGA), a microprocessor, a multi-core processor, and/or combination thereof, for example. The term processor as used herein means a single processor or multiple processors working independently or together to collectively perform a task. In some embodiments, software may be implemented in a stand-alone environment operating on a single device and/or software may be implemented in a networked environment, such as a distributed system using multiple devices and/or processors. Additionally, the processor 111 may be partially or completely network-based or cloud-based. The processor 111 may not be located in a single physical location. Additionally, multiple processors 111 may or may not necessarily be located in a single physical location. The one or more processors 111 may be capable of reading and/or executing processor executable code and/or capable of creating, manipulating, retrieving, altering, and/or storing data structures into one or more memories.

The one or more memories may be capable of storing processor executable code (e.g., website code) and/or information comprising one or more databases and program software. Additionally, the one or more memories may be implemented as a conventional non-transitory memory, such as, for example, random access memory (RAM), a hard drive, a solid state drive, a flash drive, a memory card, an optical drive, combinations thereof, and/or the like, for example.

Referring to FIG. 4, in some embodiments the mobile application 120 includes an app user file storage area 122, and an internal app engine 124. The internal app engine 124 is provided with website code 126, a bridge 127, and native device code 128. The mobile application 120 is also provided with an internal browser 130 that is used to run the website code 126. The mobile application 120 can be constructed by compiling website code by a compiling engine (e.g., Cordova, Xamarin or the like) into the internal app engine 124. The internal app engine 124 may include website code 126 executed by the processor 111 using the internal browser 130. The internal app engine 124 may also include at least one DFAPI file having one or more instructions used by the internal browser 130 to access the one or more native device hardware features 112a, 112b, and 112c. The internal browser 130 can be software known in the art as "WebView" that is supplied as part of an operating system running on the mobile device 110. In addition, the mobile application 120 enables access to one or more native device hardware features 112a, 112b, and 112c, for one or more external websites rendered in the internal browser 130 by serving as a local host for at least one program file (e.g., described hereinafter as a DFAPI file written in JavaScript or other appropriate programming language capable of being executed by the internal browser 130) used to access the native device hardware features 112a, 112b, and 112c). In some embodiments, the external website rendered in the internal browser 130 must be specified within the internal app engine 124. As used herein, the term "local host" refers to the same mobile device 110 that is executing the mobile application 120. The mobile application 120 may include software to access the at least one program file by bypassing any network interface hardware.

Further, in one embodiment, the mobile application 120 is provided with software to cause the internal browser 130 to access one or more predetermined servers, external to the mobile device 110, to verify that the mobile application 120 is licensed. The internal browser 130 may send a request for licensing information to the one or more predetermined servers. In one embodiment, if a response is not received by the internal browser 130 within a predetermined time period indicating that the mobile application 120 is not licensed, then the software of the mobile application 120 determines that the mobile application 120 is licensed and permits continued use of the mobile application 120. If the internal browser 130 receives a response indicating that the mobile application 120 is not licensed, then the software of the mobile application 120 may set a flag to disable the mobile application 120.

In one embodiment, the at least one program file (DFAPI) used to access the native device hardware features 112a, 112b, and 112c, is included by the compiling engine and stored in the internal app engine 124 within the native application 120 as indicated by the reference numeral 126 in FIG. 4. Generally, the website code 126 in the internal application engine 124 has internal control code, external control code and offline webcode. The internal control code is configured to handle copying files (such as the DFAPI files), licensing checks, and in one embodiment, is not made accessible to external domains supplying website code running in the internal browser 130. For example, the internal control code may be used to copy the at least one DFAPI file used to access the native device features 112 from the internal app engine 124 to the app user file storage area 122 that is an externally accessible area of the mobile application 120. Additionally, a current version of the DFAPI (e.g., at least one file) used to access the native device features 112 may be copied and stored in the app user file storage area 122 with each new version of the native application 120.

In another embodiment, the files stored in the internal app engine 124 can be made accessible by implementing server functionality directly into the application design. In this embodiment, the DFAPI and other locally hosted files would not be required to be copied to the app user file storage area 122. However, allowing direct server access to the files contained in the internal app engine 124 could potentially allow for unintended security issues, as well as potentially disqualify the application from some app store approval requirements by allowing the "binary" to be changed.

As will be discussed in more detail herein, files may be requested from the app user file storage area 122 as a localhost with the appropriate URL, whereas files contained in the internal app engine 124 are private and not accessible to code from external sources, such as code supplied from the External Web Server 140. Therefore, any files that need to be made available to external websites rendering in the internal browser 130 need to be copied from the internal app engine 124 to the app user file storage area 122. These files may include the DFAPI files, any ExternalControlCode, and any webcode to be rendered when the device is offline. The determination of when to copy these files may be made based upon a new version of the app itself, or upon comparing versions of the same file in both locations, i.e., the internal app engine 124 and the app user file storage area 122. The appropriate URLs from which to request each of these files may be constructed by the same logic used to determine where to copy them.

As one skilled in the art will understand, websites can be implemented with one or more servers utilizing one or more domains. The external control code enables the internal app engine 124 to function with an external website notwithstanding the number of domains and/or servers used to implement the external website. For purposes of clarity, the first domain/webcode that is supplied to the internal browser 130 will be referred to hereinafter as the "current domain" having "first webcode". Subsequent domains used to implement the external website will be referred to hereinafter as a "target domain" having "second webcode", "subsequent target domain" having "third webcode" and the like.

The external control code provides the functionality to initially execute a "handshake" between the first website code of the internal app engine 124 running in the internal browser 130 and the second website code of a target domain of the external web server 140. Thereafter, the external control code provides the functionality to execute a handshake, between, for example, the second webcode of the target domain and third webcode of a subsequent target domain. This process can be repeated for any number of subsequent target domains.

As background, when developing embodiments of the present disclosure, the first major problem to overcome was how to re-introduce appropriate copies of the DFAPI files into the internal browser 130 once the webcode from the external web server 140 had been loaded into the internal browser 130. This was either not addressed or poorly addressed in the prior hybrid applications described previously with reference to FIGS. 1-3. Rather, the hybrid application 20 shown in FIG. 1 does not run an external website in its internal browser 30. The hybrid application 20 shown in FIG. 2 runs an external website in its internal browser 30, but does not provide a method to receive the DFAPI files, as any files contained in the internal App Engine are private and inaccessible to code from external sources, such as code supplied from the external web server 40. The prior art shown in FIG. 3 addressed this problem by incorporating the DFAPI files into the website code supplied by the external web server 40. In the current design of the internal browser 130, the browser security policies do not permit one website running in the internal browser 130 (e.g., code supplied by an external web server) to know anything about any other website that has run or is currently running in the internal browser 130. This is true even though the internal browser 130 stores information about each website the internal browser 130 visits in the form of cookies, local storage variables, and cached files. When the internal browser 130 requests information from the external web server 140, the internal browser 130 may save both localStorage variables and cookies concerning the code that is loaded so that the next time that code is loaded from that external web server 140, the internal browser 130 can remember things, such as whether or not the user is currently logged in to the website and if so, with what credentials. Because any particular external web server 140 can serve code on behalf of many different websites, it is important to recognize that the information stored by the internal browser 130 for a particular website is tied to the "domain" of the website. For example, www.example.com is a specific domain for which the internal browser 130 would store information that the internal browser 130 would not share with www.example 2.com or www.example 3.com, etc.

When developing embodiments of the present disclosure, the second major problem to overcome was to make the external web server 140 client agnostic. This was accomplished by relieving the external web server 140 of the responsibility for determining the type of client being served. The present disclosure recognizes that the mobile application 120 should be aware of its status as an application when the internal browser 130 is executing code supplied from the external web server 140. This permits the mobile application 120 to request any additional website code that the mobile application 120 requires in addition to the website code that would be executed by a web browser. By having a localStorage variable set in the internal browser 130 for the specified domain of the external web server 140 that indicates that the internal browser 130 is part of the mobile application 120, the mobile application 120 can request any additional files or resources that it requires from the external web server 140, the local host/internal domain, or any other domain. By the same token, already having localStorage variables set for the external web server's domain that contains the URLs of the additional resources that the mobile application 120 needs to request creates a great deal of flexibility for supporting multiple versions of the mobile application 120.

One embodiment of the mobile application 120 described in the present disclosure recognizes that any files (e.g., the DFAPI files) stored in the app user file storage area 122 are accessible to website code supplied to the internal browser 130 by the external web server 140, as long as the URL to the files are known to the website code supplied by the external web server 140 running in the internal browser 130. Therefore, if the website code from the external web server 140 can be provided with a proper URL to the location of the DFAPI files within the app user file storage area 122, then copying the DFAPI files from the internal app engine 124 to the app user file storage area 122 makes the DFAPI files accessible to the website code from the external web server 140 running in the internal browser 130. This also provides the benefit that requesting files stored within the mobile application 120 does not use any external network bandwidth and has negligible latency.

In another embodiment, the files stored in the internal app engine 124 can be made accessible by implementing server functionality directly into the application design. In this embodiment, the DFAPI and other locally hosted files would not be required to be copied to the app user file storage area 122, and would still be accessible to website code supplied to the internal browser 130 by the external web server 140, as long as the URL to the files are known to the website code supplied by the external web server 140 running in the internal browser 130. This provides the same benefit as above that requesting files stored within the mobile application 120 does not use any external network bandwidth and has negligible latency.

As used herein, the term "external domain" refers to website code supplied by an external web server 140 running in the internal browser 130 of the mobile application 120. As used herein, the term "internal domain resources" refers collectively to all files on the local host intended to be made accessible to an external domain. The internal domain resources include the DFAPI files and may include external control code, offline webcode, and/or any other files desired to be made accessible from the internal domain to any external domain running in the internal browser 130 of the mobile application 120.

When the mobile application 120 is initially loaded, the website code 126 within the internal app engine 124 is initially rendered and executed by the internal browser 130. When this occurs, the internal control code is executed. The internal control code: in one embodiment copies the internal domain resources into the app user file storage area 122; in all embodiments determines the uniform resource locator addresses ("URLs") by which the internal domain resources may be retrieved from the internal domain on the local host; performs a license check with an external resource; instructs the external control code to perform a "handshake" with the external web server 140; and upon satisfactory license check and handshake, instructs the internal browser 130 to load its primary content from the external web server 140.

There are several methods that can be used for making the URLs to the internal domain resources known to the external domain running in the internal browser 130. Special app support code served by the external server 140 as part of the external domain contains what will be referred to herein as "client control code" responsible for utilizing these URLs to request additional resources for app clients.

In some embodiments, the client control code can be provided with one or more variables indicating the appropriate URL(s).

In some embodiments, the client control code can check a browser system-level variable for the URL(s) from which to load these files if a browser or browser plugin were to implement this process.

In some embodiments, the URLs and other pertinent information may be discovered by the client control code checking for one or more localStorage variables stored in the internal browser 130 for the external domain. The setting of the localStorage variables for the external domain can be accomplished by using the handshake described herein prior to loading the external domain as the primary content of the internal browser 130. The external web server 140 provides instructions (the client control code) to make the mobile application 120 aware of its status as an application when the internal browser 130 is executing code (the app support code) supplied from the external web server 140. This can be accomplished by the client control code checking to see if a localStorage variable is set indicating that the client is an application. If so, the client control code requests the internal domain resources; any website code from the external web server 140 necessary to add specific native device functionality to the website when running in an app client; and any code from the external web server 140 styled as app-related code (allowing for additional web code modules) working in the presently disclosed environment.

In some embodiments, the handshake is made to occur just before leaving the webpage represented by the current domain by loading the target domain in an iFrame before the internal browser 130 reloads content from the target domain. This can be accomplished by using the postMessage method to communicate between the current domain and the target domain to: verify for the current domain that the target domain has code configured to execute the handshake with the current domain; and set localStorage variables in the target domain with the information that the target domain will need to know to operate as an application with access to native device features. In some embodiments, this information may include a localStorage variable defining that the domain is running in an app client and one or more localStorage variables defining the URLs with which to request the DFAPI files and other internal domain resources from the localhost. Once the target domain in the iFrame has set the localStorage variables, the target domain in the iFrame uses the postMessage method to communicate back to the current domain to provide an affirmative response. Upon receiving the affirmative response, the current domain instructs the internal browser 130 to load its primary content from the target domain. If the target domain does not have code configured to execute the handshake with the current domain, then the target domain can be loaded in a browser external to the mobile application 120, such as the browsers known as "Safari", "Chrome", or "Internet Explorer Mobile".

In another embodiment, the DFAPI files themselves could be passed during the postMessage communication between the current domain and the target domain as either file objects or strings and then stored in acceptable formats in the localStorage variables for the target domain in lieu of URLs with which to request them. Instructions for the internal browser 130 from the target domain could convert these acceptable formats stored in the localStorage variables back into the native DFAPI file formats as necessary and load them as instructions for the internal browser 130.

In another embodiment, while both the internal domain and the external domain are both represented as frames on the page, the DFAPI files could be passed as objects via the postMessage method from the internal domain to the external domain. Having both domains represented on the page might be accomplished by the external domain always running in an iFrame with the internal domain as its parent, or by the external domain being the top level frame running in the internal browser 130 and re-introducing the internal domain in an iFrame.

In another embodiment, the local storage variables used to provide URL's to the DFAPI files could be set for any external domain without the Handshake described herein by way of the mobile application 120 "injecting" a script directly into the web page loaded from the external web server 140. This injected script would then be processed by the internal browser 130 to set the local storage variables for that domain.

In another embodiment, as the appropriate local storage variables used to provide URL's to the DFAPI files or other information concerning internal app resources could be set for any external website by way of injected scripts without a Handshake, a mobile browser or mobile browser plugin under the design philosophy of the mobile application 120 could be made to extend access to native device features to any external website 140 that implements the client control code that uses those local storage variables to load the DFAPI Files or other internal app resources.

In another embodiment, the DFAPI files themselves could by injected by the mobile application 120 into any webpage from any external web server 140 and simply be available for use by the code from the external web server 140.

In another embodiment, the DFAPI files could be a standard resource built into the internal browser 130 of the mobile application 120 and available to website code from any external web server 140.

As the internal domain resources including the at least one DFAPI file used to access the native device hardware features 112 may be loaded from the local host by the internal browser 130 when executing code from an external domain hosted by the external web server 140, no additional network bandwidth may be used or needed and there may be a negligible delay in the internal browser 130 loading the internal domain resources. Additionally, copies of the DFAPI files used to access the native device hardware features 112 may remain on the mobile device 110 eliminating need for synchronization of the files between the mobile device 110 and the external web server 140. The external web server 140 can be client agnostic, meaning the external web server 140 does not care or even need to know what type of client it is serving, as the native application 120 will request the additional resources it requires from both the local host and the external web server 140. As the DFAPI files served from the local host enable use of the native device hardware features 112a, 112b, and 112c, changes to the nature of the mobile application 120 may be made by changing the manner in which webcode served by the external web server 140 calls the APIs (Application Programming Interfaces) provided by the DFAPI files. Therefore, changes to the nature of the mobile application 120 can be made without resubmission of the mobile application 120 to application marketplaces, such as Apple's App Store or the Google Play Store, or distribution by other methods.

In some embodiments, the internal app engine 124 of the mobile application 120 may be provided with instructions to evaluate the at least one file used to access the native device hardware features 112 for copying to the app user file storage area 122 on each cold start (i.e., loading the mobile application 120 into random access memory of the mobile device 10 and initiating the running of the mobile application 120) of the mobile application 120, prior to redirecting the internal browser 130 to the external web server 140. For example, the mobile application 120 may evaluate the at least one file to determine whether there may be updates or version changes to the at least one file.

In some embodiments, the mobile application 120 may include one or more security functions that work in conjunction with a security program loaded into the website supplied by the external web server 140. In one example, the security function of the mobile application 120 enables loading of a specific page from the external web server 140. The specific page may be a HTML document embedded inside another HTML document known as an iFrame, for example. The external web server 140 may communicate with the mobile device 110 to ensure that the external web server 140 has an appropriate key before the mobile application 120 will render or otherwise run code from the external web server 140 in the internal browser 130.

In some embodiments, the external web server 140 may communicate to the mobile device 110 special code (e.g., JavaScript) instructing the mobile device 110 to evaluate preset variables (e.g. localStorage) to determine if the mobile application 120 is an application, and if so, for the internal browser 130 running on the mobile device 110 to request additional files from the local host and/or the external web server 140. These files may include, but are not limited to, the at least one file used to access native device hardware features 112, and additional files (e.g., JavaScript files) from the external web server 140 intended to be run only in an application based client. In some embodiments, the special code also instructs as to which files to request from the external web server 140 by way of one or more special objects (e.g., JavaScript Object) to which app-client-specific modules of code running on the external web server 140 have added specific application client files.

In some embodiments, the external web server 140 may further include modules of code to run within the internal browser 130 when the external website on the external web server 140 may be running in the mobile application client 120 without negatively affecting the external website when running in a browser client running outside of the mobile application 120. Such modules of code might make use of the native device hardware features 112a, 112b, and 112c enabled by the DFAPI files, or for any other reason where their instructions would be intended to run only in the mobile application 120. It should be noted that the browser client running outside of the mobile application 120, for example, would not be directed to request the additional modules of code from the external web server 140 meant only for the mobile application 120 because the browser client running outside of the mobile application 120 would not have a localStorage variable set for the domain represented by the external web server 140 that indicates a status of an application.

In some embodiments, the presently disclosed inventive concepts permit the mobile application 120 to render a live external website as the content of an app, fully able to utilize native device features (without negatively impacting traditional browser clients rendering the same website). Because the live external website is being rendered and used, every instance of the mobile application 120 has the correct version of the DFAPI files to be used, both device-type and version specific. The External Web Server 140 may be client agnostic (doesn't have to know or care whether the external web server 140 is serving a traditional browser, an iOS app, an Android app, etc.), and the app clients request separately any additional code that they require. Because the DFAPI files are pulled from the localhost no additional bandwidth is used, there is a negligible delay in loading the DFAPI files into the internal browser 130, and there are not any issues due to files getting lost in transport. Because the code that makes use of the enabled native device features is served by the External Web Server 140, changes to the nature of the app itself can be made without resubmission to the appropriate app marketplaces.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A mobile device, comprising:
   at least one native device hardware feature;
   a non-transitory computer readable medium;
   a processor executing a mobile operating system;
   network interface hardware providing external communication capabilities; and
   a mobile application stored in the non-transitory computer readable medium, the mobile application configured to operate with the mobile operating system, the mobile application having an internal browser and at least one Device Feature Application Program Interface (DFAPI) program file having instructions used by the internal browser to access the at least one native device hardware features, wherein the at least one DFAPI program file has been copied to an externally accessible file storage area of the non-transitory computer readable medium belonging to the mobile application, the mobile application having software configured to:
      enable access to the at least one native device hardware feature for at least one external website configured to work with the mobile application, the at least one external website hosted on an external web server, downloaded via the network interface hardware and rendered as the primary content of the internal browser, by receiving information from the external website via the network interface hardware to trigger serving the at least one DFAPI program file from the externally accessible file storage area of the mobile application as a localhost to the internal browser rendering the at least one external website thus bypassing the network interface hardware.

2. The mobile device of claim 1, wherein the software is further configured to evaluate the at least one DFAPI program file on each cold start of the mobile application for a version change in order to copy it to the externally accessible file storage area.

3. The mobile device of claim 2, wherein the at least one DFAPI program file is evaluated for a version change based on a single file of the mobile application.

4. The mobile device of claim 2, wherein the at least one DFAPI program file is evaluated for a version change based on the entire mobile application.

5. The mobile device of claim 1, wherein the external website has an external domain that is temporarily loaded in an iFrame contained in a webpage belonging to the internal domain rendering in the internal browser, and wherein the Mobile Application passes information from the internal domain to instructions provided by the external web server running in the iFrame to cause at least one local storage variable for the external domain to be set in the internal browser.

6. The mobile device of claim 5, wherein the local storage variable identifies the internal browser as being a part of the mobile application to instructions provided by the external domain when rendering in the internal browser of the mobile application.

7. The mobile device of claim 6, wherein the instructions provided by the external domain rendering in the internal browser are further configured to request the at least one DFAPI program file from the mobile application as the localhost that enables access to the at least one native device feature of the mobile device upon identification of the internal browser being part of the mobile application.

8. The mobile device of claim 7 wherein instructions provided by the external domain rendering in the internal browser further enable access to the at least one native device hardware feature via application programming interfaces established by the at least one DFAPI program file requested from the mobile application.

9. The mobile device of claim 6, wherein the instructions provided by the external domain rendering in the internal browser are further configured to request at least one file from the external web server upon identification of the internal browser being part of the mobile application.

10. The mobile device of claim 9, wherein the at least one file includes at least one file styled as app-related code to further enable access to the at least one native device hardware features.

11. The mobile device of claim 9, wherein the at least one file includes at least one JavaScript file intended to be run only in the mobile application.

12. The mobile device of claim 9, wherein the mobile application requests a specified file particular for the mobile application.

13. A non-transitory computer readable medium storing a mobile application configured to operate with a mobile operating system which is configured to operate with network interface hardware thus providing external communication capabilities, the mobile application having an internal app engine including first website code, an internal browser. and at least one Device Feature Application Program Interface (DFAPI) program file having instructions used by the internal browser to access at least one native device hardware features of a mobile device across a bridge to native code, the mobile application having software configured to:
 render the first website code contained in the internal app engine as an internal domain within the internal browser, the first website code contained in the internal app engine configured to:
  direct the internal browser to replace the first website code being rendered by the internal browser with second website code from a specified external domain from an external website via the network interface hardware; and
 provide the at least one DFAPI file to the internal browser bypassing the network interface hardware such that the internal browser runs the DFAPI file as part of the second website code thereby enabling the specified external domain to access the at least one native device hardware feature of the mobile device across the bridge to native code.

* * * * *